United States Patent

Leonard

[15] 3,667,612

[45] June 6, 1972

[54] ARTIFICIAL KIDNEY SYSTEM

[72] Inventor: Joe H. Leonard, 1105 Remington Rd., Knoxville, Tenn. 37921

[22] Filed: Sept. 4, 1969

[21] Appl. No.: 855,191

[52] U.S. Cl. ............................................. 210/321, 210/541
[51] Int. Cl. ................................... B01d 31/00, B01d 13/00
[58] Field of Search ........................ 210/22, 23, 321, 500, 541

[56] References Cited

UNITED STATES PATENTS

| 3,508,662 | 4/1970 | Miller | 210/321 |
| 3,567,028 | 3/1971 | Nose | 210/321 X |
| 2,720,879 | 10/1955 | Gasca et al. | 210/321 X |
| 2,969,150 | 1/1961 | Broman | 210/321 |
| 3,342,328 | 9/1967 | Swenson | 210/321 X |
| 3,490,523 | 1/1970 | Esmond | 210/321 X |

OTHER PUBLICATIONS

Kolff; " Dialysis Becomes Practical," an article used for the III' d International Congress of Hephrology, Washington, D.C., Sept. 29, 1966, pp. 36, 37

Cole et al., " The Pumpless Low Temperature Hemodialysis System," from Trans. Am. Suc. for Artificial Internal Organs, Vol. VIII, 1962, 401 pages, pp. 209– 218

Kupfer, et al., " A New Parallel Tube Continuous Hemodialyzer," from Trans. Am. Soc. For Artificial Internal Organs, Vol. V, 1959, 355 Pages, pp. 2– 7

Primary Examiner—Frank A. Spear, Jr.
Attorney—Fowler, Knobbe and Martens

[57] ABSTRACT

An open-topped, elongated, rectangular tank is mounted on a framework that is fitted with casters, enabling the unit to be moved from place to place in a hospital, clinic, or in the residence of a patient. The framework supports a motor driven recirculating pump for causing a continuous flow of a dialyzing fluid out of and back into the tank. A pair of clear, colorless elongated plates are clamped together with one or more lengths of clear colorless tubes of semipermeable material confined between them, and this assembly is immersed in the dialyzing fluid in the tank. The ends of the tube or tubes have connection to an artery and a vein of a patient, so that the patient's heart will produce a flow of his blood through the tubes, where toxic substances are removed from the blood by the dialytic action.

15 Claims, 7 Drawing Figures

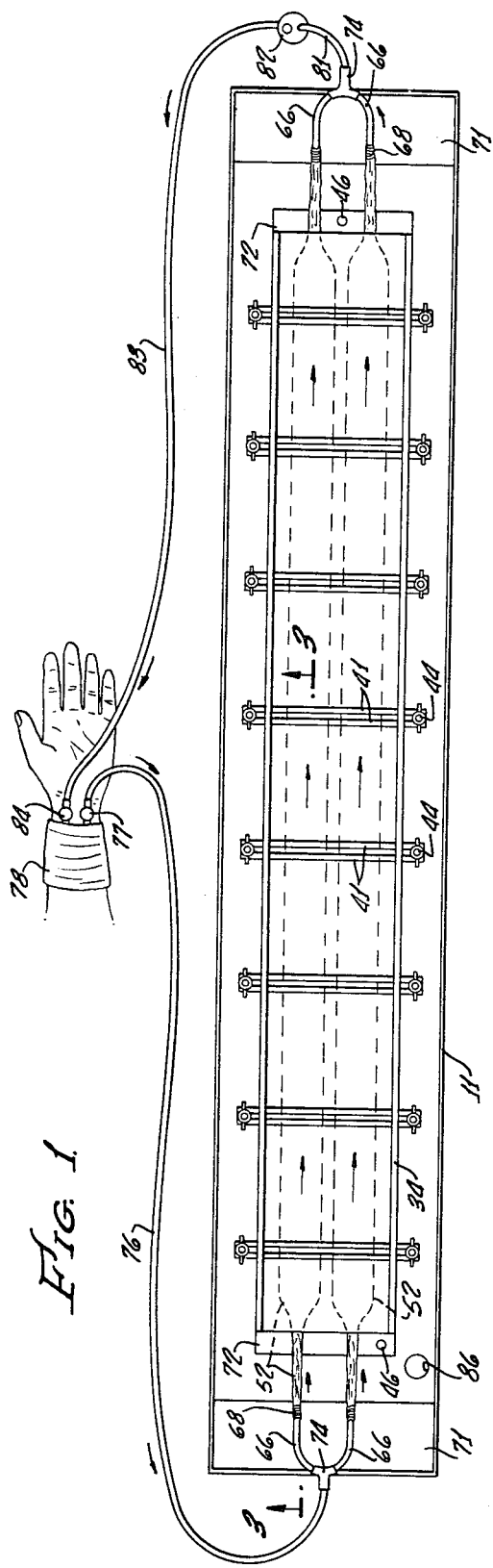
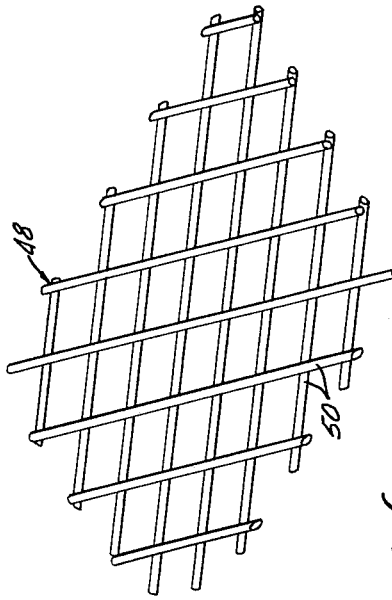
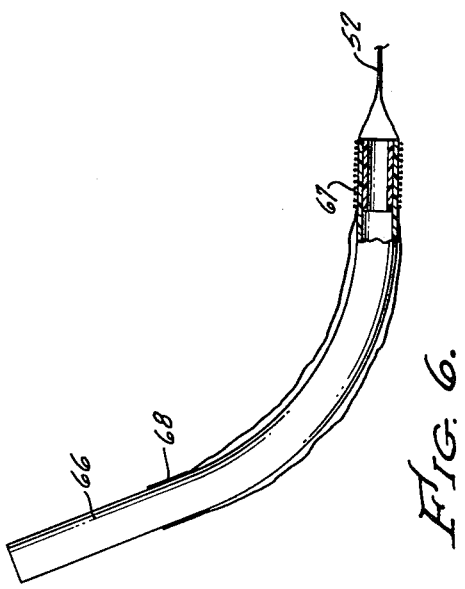
INVENTOR.
JOE H. LEONARD
BY
FOWLER, KNOBBE
& MARTENS
ATTORNEYS.

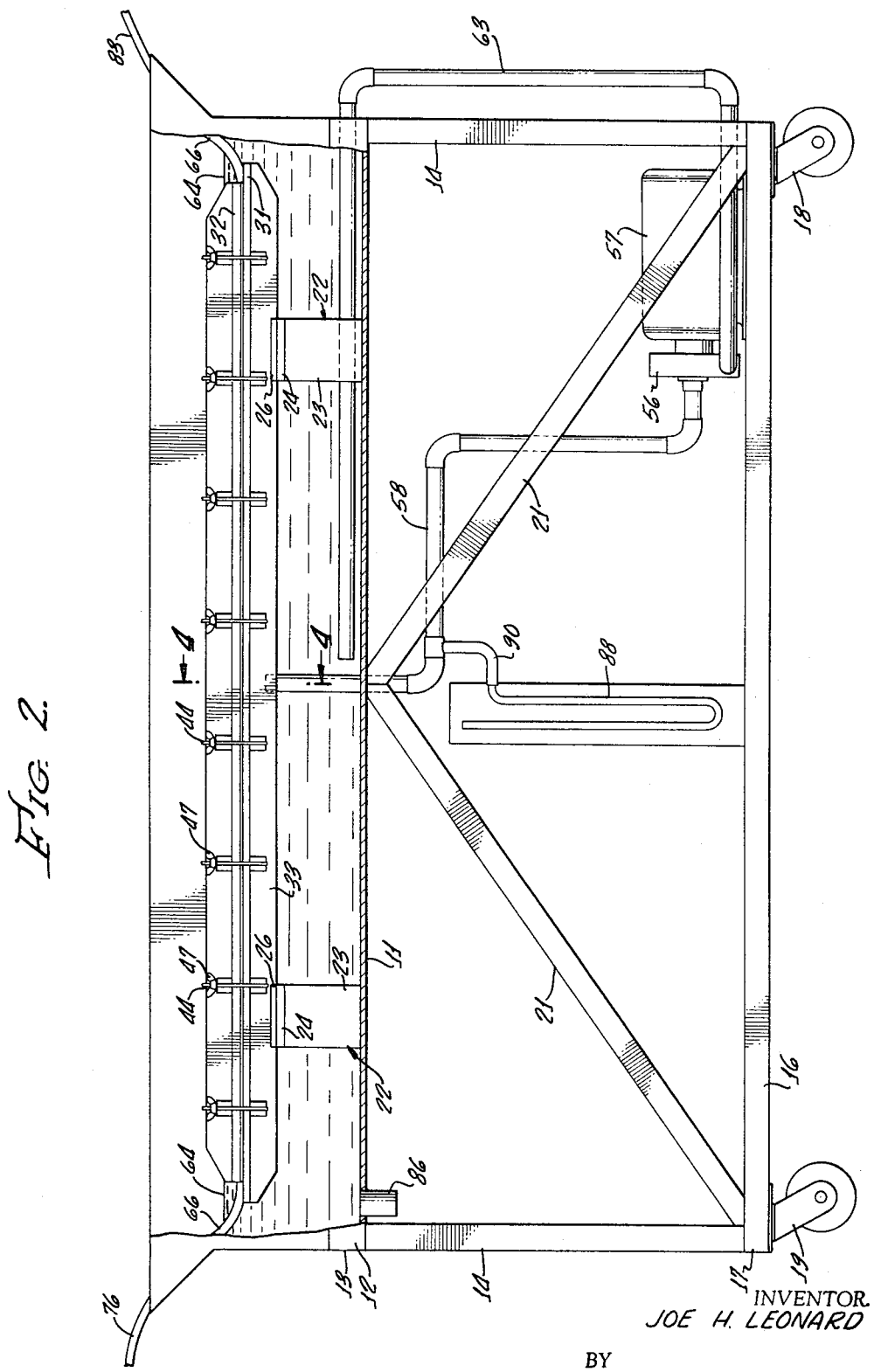

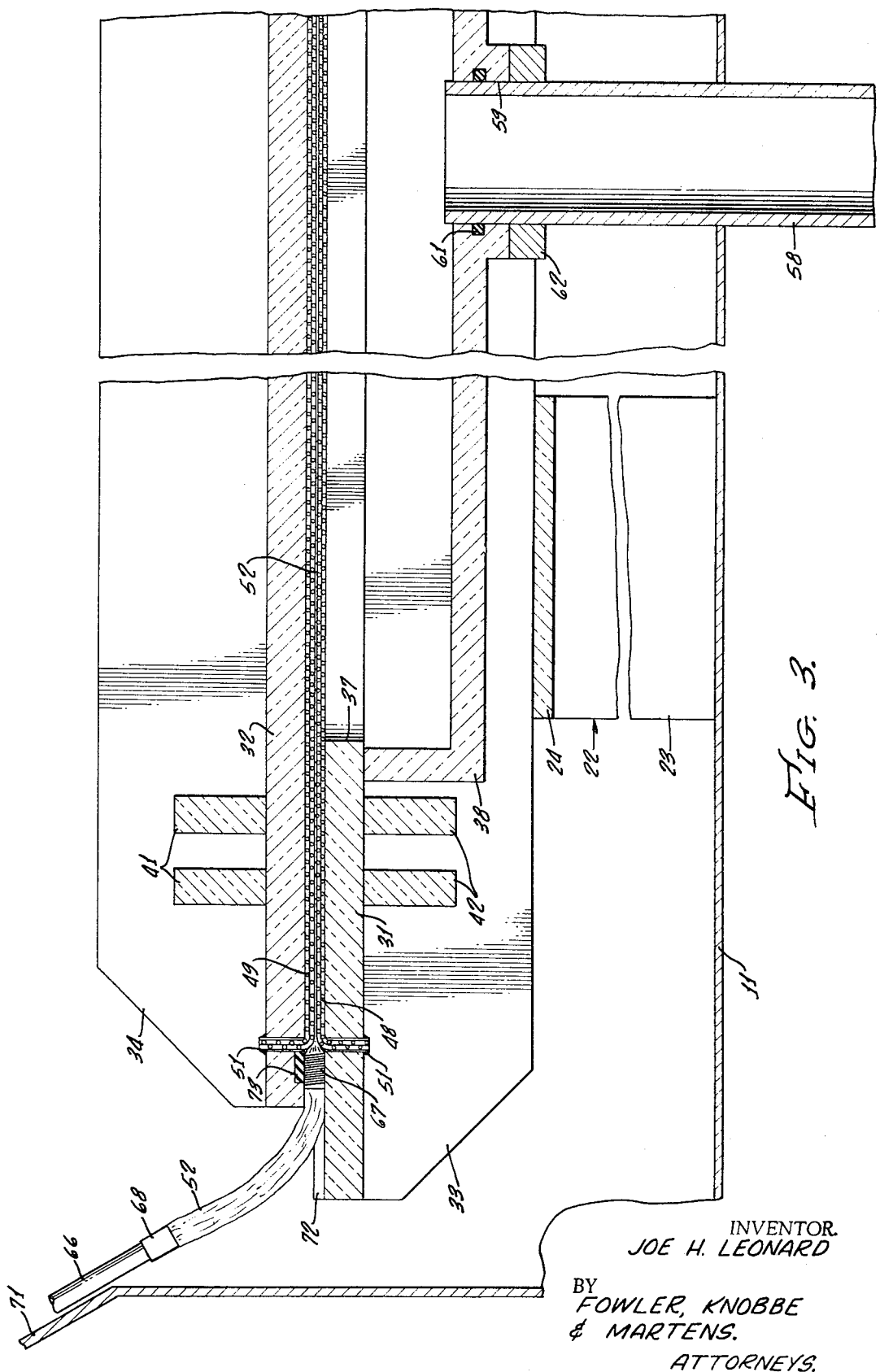

ARTIFICIAL KIDNEY SYSTEM

BACKGROUND OF THE INVENTION

The removal of toxic substances from the blood of patients whose kidneys are diseased to the extent that they will not remove these substances is accomplished by a method known as dialysis. In the practice of this method an external circuit for the flow of blood from the body of the patient is established between an artery and a vein. This external circuit includes dialyzing apparatus. In this apparatus the blood flows across and in contact with a semipermeable membrane which is immersed in a dialyzing fluid. This fluid contains, at substantially the same concentration as the blood, those blood constituents which should be returned to the body of the patient. The membrane is impermeable to the blood proteins, but it is permeable to the waste products that should be removed and accordingly they pass through the membrane by diffusion and become mixed with the dialyzing liquid.

In a prior art dialyzing device there is a frame on which two sheets, or multiple or two, of semipermeable membrane material such as cellophane have been mounted in such a way that a seal is established between the frame and the sheets are clamped between plates. At least one of the plates has an inlet and outlet port for a dialyzing fluid. The frame which carries the membranes has an inlet and outlet port for each pair of semipermeable membranes for connection by means of tubing to an artery and vein of a patient, allowing for the flow of a thin film of blood between the two semipermeable membranes. Dialyzing fluid flows up through the frame rinsing the semipermeable membranes on their surfaces which are not in contact with the blood. Dialyzing fluid is supplied to the dialyzing unit from a reservoir either by means of gravity or a pump, and then is generally discharged into a waste drain after one passage through the dialyzing frame. The plates between which the cellophane is clamped are opaque and are precision machined, at considerable expense, so that a tight seal around the circumference of the semipermeable membranes may be effected. Prior to use on a patient the unit is filled with fluid under pressure as gauged by a manometer which must show that there is no leak, either across the cellophane membranes or at their circumferences as judged by a minimal rate of fall or pressure over a certain span of time. If this test is passed the blood pathway through the dialyzer is generally sterilized by filling this pathway with formaldehyde or another sterilizing agent for a certain length of time, taking special precaution that no bubbles of air are left within the dialyzer which would preclude complete sterilization. After this, the sterilizing solution must be carefully washed out to prevent any trace entering the patient's system when connected to his artery and vein. This is a fairly elaborate, painstaking and critical procedure.

During actual treatment of the patient's blood by dialysis, if a leak should spontaneously occur, if it is a very large leak it will be detected by a blood pressure monitor at some point in the blood tubing, usually the arterial line, after sufficient blood loss has occurred to cause a fall in pressure. A smaller leak may be detected by a hemoglobin detector which is quite expensive and which is placed in the dialyzing fluid discharge line.

Close tolerances of the plates described above and the expensive monitoring equipment make it difficult for the average patient with permanent renal failure requiring this device to be able to afford this equipment for home use. In addition, the intellectual requirements for its use further limit the usefulness of this equipment by patients in the home. The routine use of this equipment for chronic patients in hospital setting, however, runs many thousands of dollars each year and is financially prohibitive in that setting for all but a very few end-stage renal patients, who are financially very fortunate.

It is, of course, of the utmost importance that all components of the system through which a patient's blood flows be completely sterile, in order that the patient's blood shall not be contaminated. The fitting of membrane sheets to the frame is an operation that can easily result in the introduction of contaminants into the blood path, particularly when this operation is attempted by relatively unskilled persons in the patient's home, including the patient himself.

The presently available artificial kidney devices are generally high capacity dialyzers adapted for use with mature adults two or three times weekly. It is thought that a smaller capacity dialyzer which could be used daily or every other day would be more physiological and permit the patient to feel better since the waste level in the blood will be fairly constant, rather than extremely high and then extremely low. A smaller capacity dialyzer would also be excellent for use with children where a small amount of extra-corporeal blood is highly desirable. Ultra filtration, or loss of fluid from the patient, could be more closely controlled or virtually prevented if desired. Such a smaller dialyzer would be much simpler to operate, bringing it within the intellectual means of most patients, and would be cheaper to manufacture and operate than the presently available dialyzers.

SUMMARY OF THE INVENTION

In accordance with the preferred embodiment of the present invention an elongated, rectangular, open-topped tank is supported by a framework mounted on casters and contains supports for a dialyzing assembly. This assembly comprises a pair of flat plates, one of which has spacer strips along the longitudinal edges of one surface to provide a space when one of the plates is placed on top of the other. A layer of mesh screening, preferably non-metallic, and not wider than the space between the spacer strips, is laid on one of the plates. On top of the screening one or more tubes made of thin, transparent, colorless cellulose sheeting, such as cellophane, are laid flat. The tubes have at their opposite ends fittings for connection to tubing that will be brought into communication with an artery and a vein of a patient. Above the cellulose tubes another sheet of screening material is laid and the top plate is placed over this layer of screening and is clamped to the lower plate along the sides of the two plates, the spacer strips closing the sides and preventing compression of the screening material and the cellulose tubes. Slots are provided along both edges of the assembly, preferably through the spacer strips, for the admission of a dialyzing fluid into the area of the screening and the cellulose tubes.

The two plates are, as an important aspect of the invention, made of a clear, transparent, colorless material such as an acrylic resin, so that the cellulose tubing is visible through the plates and through the mesh screening sheets. When the dialysis assembly is connected between an artery and a vein of the patient by means of tubing and blood begins to flow in this external circuit, the progress of the blood through the cellulose tubes confined between the layers of screening may be observed, and if an air bubble should develop and impede the flow of blood, steps may be taken to remove the bubble. Also, in the event that there is a leak in the cellulose tubing, permitting the escape of blood into the dialysis fluid, this may be observed as a discoloration of the fluid and it is not necessary to provide a monitor device for indicating pressure in the path through which the blood is flowing.

The lower of the two plates has a slot extending longitudinally over a considerable portion of the length of the plate, and a trough slightly longer than the slot, attached to the underside of the plate. The frame of the stand that supports the tank carries a motor driven pump, the input side of which is connected to the trough by a pipe entering the trough through a seal. The return line of the pump is connected by a pipe to the interior of the tank in which the dialysis assembly is immersed. With this arrangement the dialyzing liquid flows into the space between the plates through the slots in the spacer strips, around and in contact with the surfaces of the cellulose tubes through the interstices of the screening material, downwardly and out through the trough to the pump, and returns to the tank. This flow pattern provides a continuous flushing of the surfaces of the cellulose tubes to provide a concentration gradient across the membrane which is favorable to removal of the toxic substances.

In accordance with the preferred embodiment of the invention, the cellulose tubes and the adapters at their ends for attachment to flexible tubing are made available to the user in sterilized form in sealed packages. It is a simple matter for the patient or an attendant to place the cellulose tubes between the layers of screening and clamp the two plates together. Because it is practically impossible for a person, even carelessly, to bring any contaminated object into engagement with the surfaces which will contact the patient's blood during its flow through the assembly, the possibility of contamination of the blood is minimized. Such sterile packages are relatively inexpensive and the contents may be discarded after a single usage, as a procedure much to be preferred over attempted reclamation by re-sterilization. Alternatively, portions of the packages such as the cellulose tubes may be discarded and the flexible arterial or venous tubing and adapters may be re-sterilized for use with new cellulose tubing.

DESCRIPTION OF THE DRAWINGS

For a complete understanding of the invention, reference may be had to the following detailed description, to be interpreted in the light of the accompanying drawings wherein:

FIG. 1 is a plan view of a blood dialysis apparatus in accordance with the present invention;

FIG. 2 is an elevational view, partly broken away, of the dialysis apparatus shown in FIG. 1;

FIG. 3 is a sectional view taken substantially on the Line 3—3 of FIG. 1;

FIG. 6 is a detailed view, partly in section, showing the adapter at the end of one of the cellulose tubes by which connection is made to other tubing; and FIG. 7 is a plan view showing a fragment of the mesh screening material which supports and confines the cellulose tubes.

DETAILED DESCRIPTION

Figure 4:
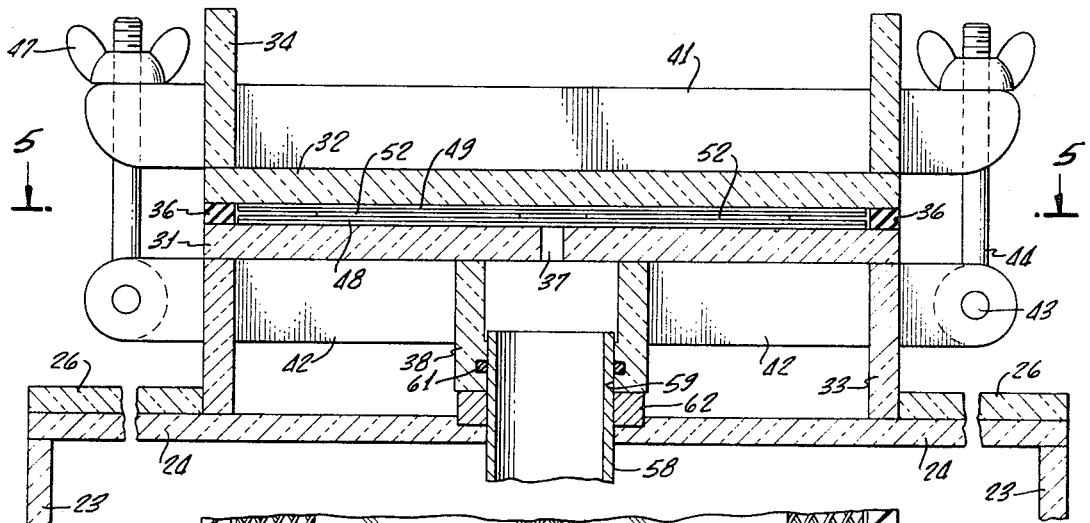
FIG. 4 is an enlarged sectional view taken substantially on the Line 4—4 of FIG. 2.

Referring now to the drawings, and particularly to FIGS. 1 and 2, the reference numeral 11 designates an elongated, rectangular open-topped tank for holding a dialysis fluid. The tank 11 is supported by a rectangular mobile stand comprised of a horizontally extending rectangular frame of side rails 12 and end rails 13 which may be angle irons. Legs 14 for supporting the rectangular frame are, in turn, supported by a rectangular frame comprised of side rails 16 and end rails 17 which may also be angle irons. The lower frame, which is comprised of the rails 16 and 17, is rendered mobile by means of casters 18 and 19; one set, as shown, the casters 18 being non-swivelled, and the other set 19 being swivelled. This is a familiar arrangement of casters and makes easy the maneuvering of the structure. As shown in FIG. 2, trusses 21 provide support for the side rails 12 intermediate their ends.

Removably resting on the bottom of the tank 11 are stands 22 for supporting the dialysis assembly in the tank 11. The stands 22 extend transversely of the tank and comprise leg members 23, a horizontal support member 24 bridging the legs 23 and barrier plates 26 on top of the bridging member 24 at its ends (see also FIG. 4). The stands 22 are preferably made of clear, colorless transparent acrylic resin so that the bottom of the tank 11 and dialyzing fluid in the tank beneath the stands will be visible from above the tank.

The principal structural elements of the dialyzing assembly are lower and upper flat plates 31 and 32. The lower plate 31 is slightly longer than the upper plate 32 and has secured to its lower surface at its edges downwardly extending flanges 33 (see FIG. 4). Similarly, the upper plate 32 has secured to its upper surface along its edges upwardly extending flanges 34.

In accordance with the preferred embodiment of the invention the plates 31 and 32 and also the flanges 33 and 34 are of a clear, colorless transparent acrylic resin. It is less important that the flanges be of transparent material than the plates 31 and 32 but the structure gains from the standpoint of appearance by having all components made of the same material. The width of the plates 31 and 32 is such that the flanges 33 may rest upon the bridging member 24 of the stand 22 between the barrier plates 26 and these plates serve to position the dialyzing assembly in the tank generally parallel to the sides of the tank and midway between them. The flanges may be cemented to the upper and lower plates.

One or the other of the plates 31 and 32 is provided with thin spacer and sealant strips 36 (FIG. 4) secured to the opposite face of the plate from the flanges and extending the length of the plate. These spacer and sealant strips will be assumed to be attached, by cement, to the lower surface of the upper plate 32. When the upper plate 32 is placed on top of the lower plate 31 there is a space equal to the thickness of the spacer and sealant strips 36 between the facing surfaces of the plates inside the strips. The spacer and sealant strips 36 are preferably constructed from a resilient, durable material such as silicone rubber.

As best shown in FIG. 3, for a substantial portion of its length the lower plate 31 has a slot 37 extending longitudinally of the plate, and to the underside of the plate is secured, as by cementing, a trough 38 closed at the ends, which are disposed a short distance beyond the ends of the slot 37. From this it will be apparent that the space between the superposed plates 31 and 32 will be in communication with the trough 38 through the slot 37.

The flanges 34 of the upper plate 32 are provided at intervals throughout their length with pairs of rectangular slots for receiving pairs of clamping bars 41 which are rectangular in cross section and of sufficient length to extend outside the flanges 34 at both ends, as shown in FIG. 2. Similarly, the flanges 33 of the lower plate 31 are provided with rectangular slots to receive pairs of transversely extending clamping bars 42. As best shown in FIG. 4, the bars 42 cannot extend through from flange to flange as do the bars 41 because of the trough 38 but the bars 42 are secured, as by cementing, to the lower surface of the plate 31 and also at their inner ends to the sidewalls of the trough 38. Each pair of the clamping bars 42 pivotally supports, by means of a pin 43, an eyebolt 44.

As shown in FIG. 1, the lower plate 31 has locating pins 46 extending upwardly from its upper surface at each end, one being off center and the other centered. The upper plate 32 is provided with holes in positions matching the pins 46. When the upper plate 32 is placed upon the lower plate 31 with the locating apertures fitted over the pins 46 the pairs of clamping bars 41 of the upper plate are aligned with the pairs of clamping bars 42 of the lower plate. It will be apparent that with the locating pins 46 positioned as shown in FIG. 1 the plates 31 and 32 are keyed so that they may be fitted together only one way. When they are positioned in this manner the eyebolts 44 may be moved pivotally upwardly to bring their shanks between the free ends of the upper clamping bars 41 after which wing nuts 47 that threadily engage the shanks of the eyebolts 44 may be tightened to clamp the plate 32 firmly in position above the plate 31, the spacer strips 36 providing a space defined by the facing surfaces of the plates 31 and 32 and the inner edges of the spacer strips 36.

The space between the two plates 31 and 32 is intended to receive the membranes or cellulose tubes through which the blood will flow for dialytic treatment. The cellulose sheet material of which the tubes are fabricated is very thin and accordingly it is desirable that they be supported out of engagement with the surfaces of the plates in order that the dialyzing liquid may flow freely in contact with their surfaces. For providing this support, lower and upper layers 48 and 49, respectively, of mesh screening material are provided. A fragment of a screening material which has been found to be very satisfactory for this purpose is shown in FIG. 7. It consists of two layers of thin, generally cylindrical plastic rods or strands 50, the rods or strands in each layer being parallel to one another and extending obliquely to those in the other layer without interweaving, and with fusion or joinder of all intersections of strands, thereby achieving a flexible mesh structure which provides trapezoidal apertures and is highly resistant to being deformed in its own plane by attempted movement of an edge in either directional parallel to a stationarily held opposite edge. The use of this type screening material reduces the necessity for precise machining of the plates 31 and 32 and the strips 36 since the lower and upper layers of the screening material 48 and 49 can be pressed tightly together with no space left for the cellophane tubing at all and still, due to the weave, blood can simply sinuously pass through the cellulose tubes 52 with little difficulty.

The plates 31 and 32 are provided near their ends with transverse slots 51 extending between the spacer strips 36 and each of the plates receives a layer of the mesh screening material laid flat against the surface of the plate and with the ends brought through the slots 51, and preferably cemented. When the cellulose tubes, designated by the reference numeral 52, are placed longitudinally between the layers of mesh screening 48 and 49, and the wing nuts 47 are tightened on the eyebolts 44, the upper and lower surfaces of the flattened tubes 52 will not be so confined as to prevent the flow of a liquid longitudinally from one end of the tube to the other inside the tube.

Figure 5:
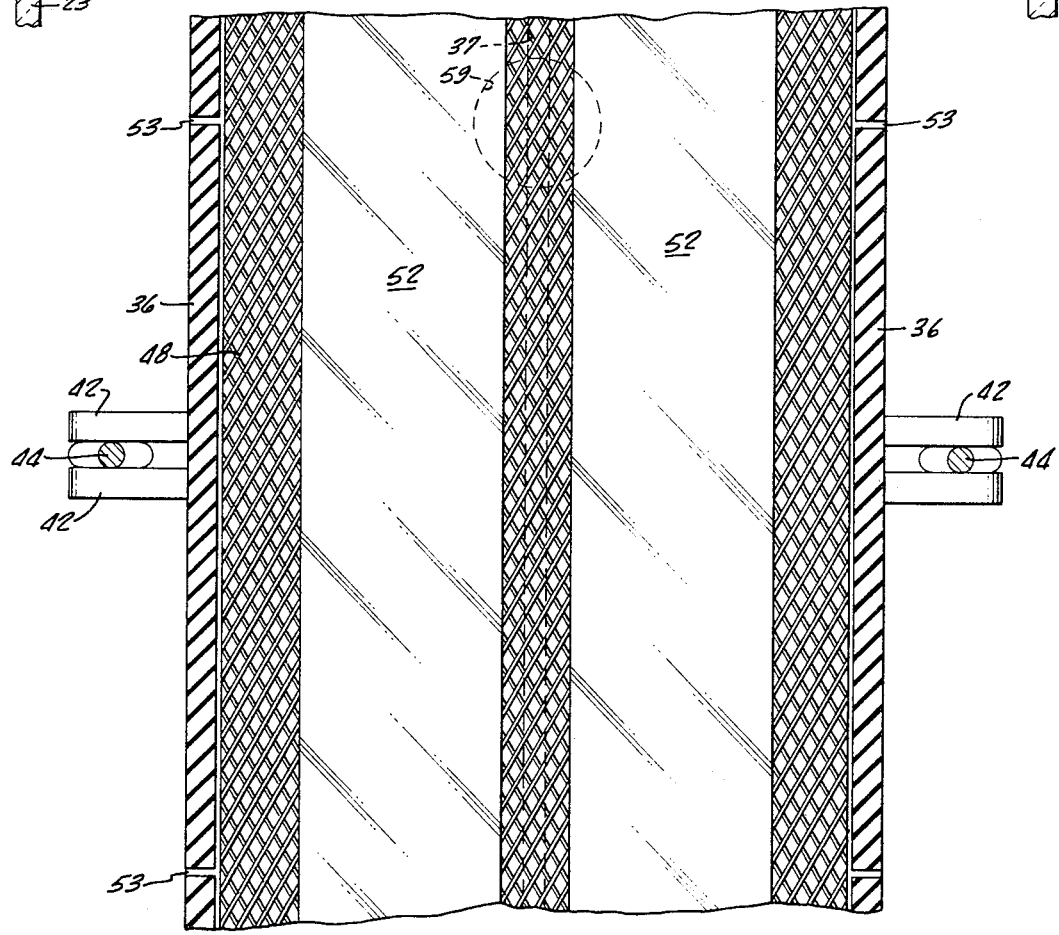
FIG. 5 is a fragmentary sectional view taken substantially on the Line 5-5 of FIG. 4.

As shown in FIG. 5 the spacer and sealant strips 36 are provided with vertically extending slots 53 spaced at intervals along the strips to permit the flow of a dialyzing fluid from outside the dialyzing assembly into the space occupied by the mesh screening material and the cellulose tubes.

As shown in FIGS. 2 and 4, the framework of the mobile stand for the tank 11, specifically that portion of the framework comprising the rails 16 and 17, supports a centrifugal pump 56 driven by a motor 57. The intake pipe 58 of the pump extends to the center of the tank 11 and upwardly through the bottom where it enters a circular aperture 59 in the bottom of the trough 38 near the center. The aperture 59 in the trough 38 has an internal annular groove which receives a gasket ring 61 that forms a seal between the pipe 58 and the trough 38. The pipe 58 may be provided with a flange 62 that engages the lower surface of the trough 38 when the dialyzing assembly is placed in position in the tank 11, resting upon the stands 22. The outlet of the pump 56 is connected by a return pipe 63 to the interior of the tank 11.

When the device is to be used for the dialytic treatment of the blood of a patient, dialyzing fluid at a temperature near the normal body temperature is poured into the tank 11 until the level of this liquid is slightly higher than the slots 53 in the spacer strips 36. The appropriate level of dialyzing liquid in the tank 11 is indicated at 64 on FIG. 2. The motor 57 is then started to cause the pump 56 to operate. The dialyzing fluid that has found its way into the trough 38 through the slots 36 in the spacer members and through the slot 37 in the lower plate 31 will be drawn off through the pipe 58 and returned to the tank through the pipe 63. As the fluid is drawn from the trough 38 it is replaced by fluid entering through the slots 53 and thus a continuous circulation of dialyzing fluid in intimate contact with the surfaces of the cellulose tubes 52 is established, the mesh screening 48 and 49 permitting this flow. This continuous flow flushes the outer surfaces of the cellulose tubes 52 to maintain a gradient across the membranes for removal of the toxic substances from the blood.

Reference has been made hereinbefore to the fact that the circuit through which the blood circulates must be sterile in order that it shall not become contaminated. This includes the interior of the cellulose tubes 52 as well as interconnecting fittings and tubes. FIG. 6 shows a preferred arrangement for connecting the cellulose tubes to external tubing. As shown in FIG. 6, the end of the cellulose tube 52 is fitted over a connecting tube 66 for a distance of several inches. This is so that the cut end of the cellulose tube 52 may exit entirely above the dialyzing fluid level. If, by chance therefore, there is a seal leak no unsterile dialyzing fluid will be able to enter the blood stream, thus providing a double safety factor. It is not required, however, that the end of the tube 52 extend above the dialyzing fluid surface. The tube 66 may be any of the usual types of material used for this purpose such as silicone rubber, teflon, polyethylene, polyvinyl chloride or rubber, and may be rigid or flexible as desired, and in the case of rigid tubing, straight or curved. In FIG. 6 the tube 66 has a curved configuration.

At the end of the tube 66 that enters the cellulose tube 52, the latter is gathered around the tube 66 and an external pressure seal member such as wrapping 67, or any other satisfactory sealing means, such as heat contractible plastic or sutured rubber segments, is applied to bring the interior of the cellulose tube 52 into intimate engagement with the external surface of the tube 66 at its inner end and to confine the cellulose tube in such engagement. A short length of rigid tubing (not shown) may be inserted into the end of the tube 66 to prevent the tube from collapsing when the pressure seal is applied. Because the cellulose film of which the tube 52 is made is very thin, it may be gathered closely around the end of the tube 66 without significant bunching. At its free end the cellulose tube 52 again may be gathered closely around the tube 66 and a wrapping 68 applied at that point to maintain close contact of the cellulose tube 52 with the tube 66. Providing an external pressure seal at one point only may, however, be found to be sufficient, as a protection against contamination. Both ends of the cellulose tube 52 will be similarly terminated by a tube 66. As is shown in FIG. 2, the tank 11 is preferably provided with a sloping surface 71 at each end, on which the tubes 66 terminating the cellulose tubes 52 may rest, thereby avoiding any sharp bends which might constrict the blood circuit.

In order to provide a firm association of the terminations for the cellulose tubes 52 with the dialyzing assembly, the lower plate 31 of the assembly has secured to its upper surface at both ends a transversely extending block 72, (FIGS. 1 and 3), preferably of the same type of material as the other parts of the dialyzing assembly, and of slightly lesser thickness than the space between the facing surfaces of the plates 31 and 32 when they are clamped together. The blocks 72 are provided with grooves to receive the inner ends of the tubes 66. At the point where the wrapped inner end of the tube 66 will lie in the block 72 the upper plate 32 has, in its lower surface, a groove in which is embedded a strip 73 of resilient cushioning material, such as rubber or any synthetic cushioning substance. The cushioning strip 73 protrudes slightly from the lower surface of the plate 32, so that when the plates are clamped together with the wrapped end of the tube 66 positioned below the cushioning strip the end of the tube 66 will be gripped and frictionally held without crushing.

When two of the cellulose tubes 52 are employed for dialytic treatment of the blood of a patient the free ends of the tubes 66 at each end of the dialyzing assembly are attached to Y-fittings 74, thereby creating a manifold at each end of the assembly. One of the Y-fittings 74 is connected by tubing 76 to a cannula 77 which is inserted into an artery in a portion of the patient's body, as for example the arm 78. Blood will flow from the artery solely as a result of the pumping action of the patient's heart through the tube 76 and enter the dialyzing assembly at the left hand end as viewed in FIG. 1. At the opposite end the Y-fitting 74 is connected by tube 81 to the inlet of a drip chamber 82 which serves as an air trap. The outlet of the drip chamber 82 is connected by tube 83 to a cannula 84 which is inserted into a vein of the patient.

As the patient's blood progresses rightwardly as viewed in FIG. 1 its progress may be observed through the colorless transparent upper plate 32 of the dialyzing assembly. The air contained in the system will be driven out and will escape at the drip chamber 82 until fluid blood reaches that chamber. Air must, of course, be exhausted from the tube 83 so that it will not enter the vein of the patient. This may be accomplished by delaying the insertion of the cannula 84 into the vein of the patient until the blood reaches that point.

When the dialytic treatment of the patient's blood has proceeded for the prescribed period of time the treatment is concluded by removing the cannula 77 or by disconnecting the tube 76 from the cannula 77 and stopping the flow of blood from the cannula. The cover 32 is removed from the dialyzing apparatus and the tubing 76 is elevated so that the blood drains into the cellophane strips and the cellophane strips are elevated beginning at the left hand end of the dialyzing assembly so that the blood drains toward the right, flow continues into the patient through tube 83. Tube 76 and the cellophane strips are thus quickly and visually emptied of all their blood so that the only blood remaining is in the tubing leaving the dialyzer. This may be completely returned to the patient by sterilely disconnecting the Y fitting 74 at the right hand side of the dialyzer and raising it so as to return the blood from segment of tubing 81, the drip chamber 82 and the tubing 83 by gravity. Alternately the blood may be returned by clamping the segment of tubing 81 with a hemostat or other suitable device and injecting air through a syringe into the drip chamber 82 sufficient in amount to force all the blood out of the drip chamber and out of the tubing 83 up to the point of the cannula 84. This is, of course, done carefully to prevent air embolism. It is of major importance that all of the patient's blood be returned to his body, because patients whose kidneys are diseased generally do not manufacture blood readily and are quite anemic.

It is contemplated that the dialyzing assembly and the connecting tubing shall have a fluid capacity of the order of 100 cc. Some prior art dialyzers have a fluid capacity of as much as 1,000 cc. If a leak should occur in a system having small or large extra-corporeal blood capacity it must be assumed that the extra-corporeal blood has become contaminated by the dialyzing fluid and must be discarded. In view of the previously mentioned limited ability of a person with diseased kidneys to manufacture blood, it is most beneficial to a patient to be able to minimize loss of blood. The visual indication of the occurrence of a leak that is afforded by the device of the present invention enables the prompt cutting-off of the extra-corporeal flow at the arterial cannula.

At the conclusion of a dialytic treatment that part of the dialyzing assembly that is comprised of the cellulose tubes 52 and their associated connecting tubes 66 is discarded and the dialytic liquid may be drained from the tank 11 through drain orifice 86. The cellulose tubes 52 with the connecting tubes 66 associated with them are so inexpensive that it is pointless to attempt to reuse them because it would be necessary to sterilize their interior surfaces. Since they may be supplied either singly or in pairs, the readiness for use of new cellulose tubes freshly removed from a hermetically sealed package is assured. If, because such a package is found to be not properly and completely sealed, or if in handling the articles after removal from the package there arises any uncertainty as to freedom from contamination, they may be re-sterilized by gas sterilization or even by autoclaving.

It may be advantageous to include more of the blood circuitry than the terminated cellulose tubes 52 in the sealed package. For example, the package might include, fully assembled and interconnected, all components including the drip tube and the two cannulae. The package could provide for dual or single semipermeable tubes. Such packaging would simplify usage of the equipment in the home, where a low level of experience in avoiding contamination of separate components may prevail. After use, the semipermeable tubes could be cut away and discarded. The rest of the circuitry, being durable and reusable, could be returned to the supplier to be fitted to new semipermeable tubes, sterilized and packaged.

As previously stated, it is unnecessary with this dialyzing apparatus to monitor the blood pressure in the system and no monitoring equipment is required. Leakage in any of the external tubings or fittings will, of course, be readily apparent and any leakage that may occur anywhere in the dialyzing assembly will also be readily observable because its components are made of clear, transparent and colorless substances.

If desired the stand that supports the tank 11 may be provided with a manometer 88 connected by a tube 90 to the pumping circuit for the dialyzing fluid, in order to afford visual indication that the desired vacuum for ultra-filtration is maintained. If more vacuum were desired wing nuts 47 might be tightened further, or loosened further for less ultra-filtration of fluid.

While cellulose membranes are preferred for the dialyzing membranes of this invention, it should be understood that any semipermeable membranes having a pore size of about 24 angstroms and sufficiently large to permit passage of the toxic waste substances, but not large enough to permit passage of the blood molecules therethrough, may be used.

It was stated hereinbefore that the dialyzing liquid should be brought to approximately human body temperature that will neither chill nor unduly heat the blood passing through the dialyzing assembly. It is contemplated that with this simple and relatively inexpensive blood dialyzing equipment, as compared with the costly previously known devices for this purpose, the patient may have the equipment in his home and use it frequently and for short periods of time. If the circumstances require continuous usage for extended periods, which would result in undesirable cooling of the dialyzing liquid, there may be added to the tank 11 an electrical immersion heating coil with thermostatic control to maintain the dialyzing liquid at the desired temperature.

It should be noted that other means than the removably retained layers of mesh screening 48 may be employed for enhancing the flow of dialyzing fluid in contact with the cellulose tubes by inhibiting substantial surface contact between the cellulose tubes 52 and the plates 31 and 32. For example, in the molding of the plates 31 and 32 from acrylic resin the surfaces that are to face the tubes 52 may be made irregular or unsmooth in a cross-hatch pattern, or perhaps a stipple pattern. Alternatively, a rigid or semi-rigid mesh may be embedded in the surfaces of the plates 31 and 32 that will face the tubes 52.

Additionally, it should be noted that the slots 53 in the spacer and sealant strips 36 may be replaced by a series of small orifices in the upper and lower plates 31 and 32 near their longitudinal edges. Instead of the two cellophane tubes, a single wide cellophane tube may be used, and the dialyzing fluid may be drawn across the tube from one edge of the compressing plates to the other edge. In this case the whole length of the two compressing plates with the cellophane tube therebetween may be inserted into a vacuum manifold.

I claim:

1. Apparatus for subjecting a fluid to dialytic treatment which comprises:
    an elongated conduit for a fluid to be subjected to dialytic treatment comprised of transparent semipermeable membraneous material and free of solid objects internally;
    a pair of members at least one of which is transparent for mounting the conduit in outstretched longitudinal condition whereby the entire length of the conduit may be observed and for confining the conduit to a predetermined maximum volumetric accommodation;
    means for inhibiting substantial surface contact between the conduit and its mounting members;
    means for connecting the ends of the conduit to supply and return facilities of a source of fluid to be treated; and
    means for subjecting the external surface of the conduit to contactual engagement with a dialyzing fluid.

2. Apparatus for subjecting a fluid to dialytic treatment which comprises:
    an elongated conduit for a fluid to be subjected to dialytic treatment comprised of transparent semi-permeable membraneous material and free of solid objects internally;
    a pair of members at least one of which is transparent for mounting the conduit in outstretched longitudinal condition whereby the entire length of the conduit may be observed and for confining the conduit to a predetermined maximum volumetric accommodation;

a layer of perforate material interposed between the conduit and each of its mounting members for enhancing access of the dialyzing fluid to the surface of the conduit and exposing the conduit to view through the transparent conduit mounting member;

means for connecting the ends of the conduit to supply and return facilities of a source of fluid to be treated; and means for subjecting the external surface of the conduit to contactual engagement with a dialyzing fluid.

3. Apparatus for subjecting a fluid to dialytic treatment which comprises:

an elongated conduit for a fluid to be subjected to dialytic treatment comprised of transparent semipermeable membraneous material and free of solid objects internally;

a pair of members at least one of which is transparent for mounting the conduit in outstretched longitudinal condition whereby the entire length of the conduit may be observed and for confining the conduit to a predetermined maximum volumetric accommodation and a flattened cross-sectional configuration;

means for connecting the ends of the conduit to supply and return facilities of a source of fluid to be treated; and means for subjecting the external surface of the conduit to contactual engagement with a dialyzing fluid.

4. Apparatus in accordance with claim 3 including spacer means interposed between the conduit mounting members for providing predeterminedly limited space for expansion of the conduit in the direction of its minor dimension to accomodate the flow therethrough of the fluid to be subjected to a dialytic treatment.

5. Apparatus for subjecting a fluid to dialytic treatment which comprises:

an elongated conduit for a fluid to be subjected to dialytic treatment comprised of transparent semipermeable membraneous material and free of solid objects internally;

a pair of members at least one of which is transparent for mounting the conduit in outstretched longitudinal condition whereby the entire length of the conduit may be observed and for confining the conduit to a predetermined maximum volumetric accommodation;

terminating means for the conduit which comprises a length of tubing inserted into the conduit so as to provide an overlap between the conduit and the tubing and having the conduit circumferentially contacting the tubing at at least one point in their coextensive length of overlap and means for providing a fluid tight seal between the length of tubing and the conduit at said one point of circumferential contact;

means for connecting the terminating means for the conduit to supply and return facilities of the source fluid to be treated; and means for subjecting the external surface of the conduit to contactual engagement with a dialyzing fluid.

6. Apparatus in accordance with claim 5 in which the circumferential contact of the conduit with the tubing and the sealing means are at the inner end of the tubing relative to the overlapping relation between the conduit and the tubing.

7. Apparatus in accordance with claim 5 in which the circumferential contact of the conduit with the tubing and the sealing means are at the end of the conduit.

8. Apparatus in accordance with claim 5 in which one of two circumferential contacts of the conduit with the tubing and first sealing means are at the inner end of the tubing relative to the overlapping relation between the conduit and the tubing and the other circumferential contact of the conduit with the tubing and a second sealing means are at the end of the conduit.

9. Apparatus in accordance with claim 5 having means for connecting terminating means at either end of the conduit to an artery of a patient whose blood is to be subjected to dialytic treatment and means for connecting the other terminating means to a vein of the patient.

10. Apparatus in accordance with claim 5 in which the conduit emerges from the dialyzing fluid and has at least one end disposed above the surface of the dialyzing fluid.

11. Apparatus in accordance with claim 5 in which the sealing means surrounds the conduit at the point of circumferential contact of the conduit with the tubing and applies pressure to the circumferential contact.

12. Apparatus for subjecting a fluid to dialytic treatment which comprises:

an elongated, open-topped tank adapted to contain a dialyzing fluid at a predetermined minimum depth;

an elongated conduit for a fluid to be subjected to dialytic treatment comprised of semipermeable membraneous material;

means comprising a plate immersed in the dialyzing fluid in the tank for supporting the conduit in outstretched condition, the plate having a slot extending longitudinally thereof beneath the conduit;

an elongated trough sealed to the underside of the plate below and in communication with the slot and having a drain orifice;

a fluid pump for the dialyzing fluid having its intake connected to the drain orifice in the trough to draw dialyzing fluid from below said conduit downwardly through the slot and through the trough; and a fluid return duct connected between the outlet of the pump and the interior of the tank to return to the tank dialyzing fluid drawn off through the slot and the trough.

13. Apparatus in accordance with claim 12 in which the means for supporting the conduit comprises, in addition to the supporting plate:

a cover plate for the conduit;

spacer means interposed between the plates on opposite sides of the conduit to provide a tunnel confining the conduit to a flattened transverse configuration and having ports for admitting dialyzing fluid to the tunnel to contact the surface of the conduit and be drawn off through the slot; and clamping means for clamping together the plates and the interposed spacer means.

14. Apparatus in accordance with claim 13 including a layer of perforate material between the conduit and each of the plates for enhancing access of the dialyzing fluid to the surface of the conduit.

15. Apparatus for supporting in a dialyzing fluid a conduit for a fluid to be dialyzed in the form of a flattened elongated tube of thin semipermeable membraneous material which comprises:

a first elongated flat plate for receiving and supporting the conduit and having at each end thereof a transversely extending slot;

a pair of spaced flanges depending from and extending longitudinally of the plate and each having apertures at intervals along its length in alignment with those of the other flange;

a second elongated flap plate adapted to be superimposed upon the first elongated flap plate and having at each end thereof a transversely extending slot;

rail means attached to one of the plates on the surface thereof that faces the other plate for spacing them apart to accommodate the conduit;

a pair of spaced flanges extending longitudinally of the second plate and upwardly therefrom when the plate is superimposed on the first plate, and having apertures matching in location and spacing the apertures in the flanges of the first plate;

members contained in the apertures and projecting laterally from the flanges in aligned pairs above and below the plates along both edges thereof;

means for exerting a tension between the upper and lower members of a pair to develop pressure between the plates; and a strip of perforate material carried by each plate on the face presented toward the other plate at least coextensive with the conduit and with the ends of each of the perforate strips inserted into and retained in the slots in its associated plate, said strips precluding surface contact between the conduit and plates and thereby enhancing access of the dialyzing fluid to the surface of the conduit.

* * * * *